United States Patent
Sheidler et al.

(10) Patent No.: US 7,779,616 B2
(45) Date of Patent: Aug. 24, 2010

(54) VEHICLE WITH ELECTRIC HYBRID POWERING OF EXTERNAL LOADS AND ENGINE-OFF CAPABILITY

(75) Inventors: Alan D. Sheidler, Moline, IL (US); James W. Musser, Charlotte, NC (US); Peter Finamore, Matthews, NC (US)

(73) Assignee: Deere & Company, Moline, IL (US)

( * ) Notice: Subject to any disclaimer, the term of this patent is extended or adjusted under 35 U.S.C. 154(b) by 126 days.

(21) Appl. No.: 12/132,127

(22) Filed: Jun. 3, 2008

(65) Prior Publication Data

US 2009/0294191 A1    Dec. 3, 2009

(51) Int. Cl.
*A01D 57/26* (2006.01)
*A01B 69/00* (2006.01)

(52) U.S. Cl. ............................. 56/1; 701/50; 56/10.2 R

(58) Field of Classification Search .............. 56/10.2 R, 56/10.2 A–10.2 G, 1, 11.1, 11.3, 11.9; 172/2–11; 37/348; 701/50, 207, 213, 208, 52, 53, 56, 701/98; 180/65.8, 65.2
See application file for complete search history.

(56) References Cited

U.S. PATENT DOCUMENTS

| | | | |
|---|---|---|---|
| 5,995,895 A * | 11/1999 | Watt et al. ..................... | 701/50 |
| 6,745,117 B1 * | 6/2004 | Thacher et al. ............... | 701/50 |
| 7,276,806 B1 | 10/2007 | Sheidler et al. | |
| 7,335,123 B2 * | 2/2008 | Morscheck et al. ............ | 475/5 |
| 7,487,757 B2 * | 2/2009 | Radovanovic et al. ....... | 123/357 |
| 7,614,224 B2 * | 11/2009 | Kato ........................... | 60/414 |
| 2008/0060858 A1 | 3/2008 | Sheidler et al. | |
| 2008/0064558 A1 | 3/2008 | Sheidler et al. | |
| 2008/0065301 A1 | 3/2008 | Sheidler et al. | |

FOREIGN PATENT DOCUMENTS

EP    1897771 A2    3/2008

* cited by examiner

*Primary Examiner*—Robert E Pezzuto
(74) *Attorney, Agent, or Firm*—Taylor IP, P.C.

(57) ABSTRACT

A vehicle includes a power unit mechanically couplable with one or more primary loads, including a propulsion load. At least one electrical storage device has an electrical output which is couplable with at least one external load over a drive period of time. Each external load is distinct from the one or more primary loads. A generator is mechanically couplable with the power unit and electrically couplable with the at least one electrical storage device. The generator has an electrical charging output to the at least one electrical storage device. At least one electrical processing circuit is configured for selectively coupling the at least one electrical storage device with one or more external loads. The at least one electrical processing circuit is also configured for selectively coupling the generator with the at least one electrical storage device over a charging period of time. The charging output and the charging period of time are dependent upon the electrical output from the at least one electrical storage device and the drive period of time.

47 Claims, 4 Drawing Sheets

VEHICLE WITH ELECTRIC HYBRID POWERING OF EXTERNAL LOADS AND ENGINE-OFF CAPABILITY

FIELD OF THE INVENTION

The present invention relates to vehicles powered by engines, and, more particularly, to vehicles such as work machines including an internal combustion engine which may be used to drive primary and external loads.

BACKGROUND OF THE INVENTION

A vehicle such as a work machine in the form of a construction work machine, an agricultural work machine or a forestry work machine, typically includes a power unit in the form of an internal combustion (IC) engine. The IC engine may either be in the form of a compression ignition engine (i.e., diesel engine) or a spark ignition engine (i.e., gasoline engine). For most heavy work machines, the power unit is in the form of a diesel engine having better lugging, pull-down and torque characteristics for associated work operations.

The load impact on an IC engine may be the result of a drivetrain load (e.g., an implement towed behind the work machine) or an external load (i.e., a non-drivetrain load). External loads can be classified as including both parasitic and auxiliary loads. Parasitic loads are non-drivetrain loads placed upon an engine through normal operation of the work machine, without operator intervention (e.g., an engine cooling fan, hydraulic oil cooling circuit pump, etc.). Auxiliary loads are non-drivetrain loads placed upon an engine through selective operator intervention (e.g., an auxiliary hydraulic load such as an unloading auger on a combine, a front end loader, a backhoe attachment, etc.)

The demands for increased performance and fuel economy will increase significantly for work machines within the next decade. This will be complicated by the implementation of devices to reduce emissions. The increasing size and productivity of work machines is expected to result in power demand higher than will be available from economical single internal combustion engines. This will drive the development of vehicles using very large, heavy and expensive industrial engines. The complexity and cost of such engines may be prohibitive and curtail the implementation of higher capacity machinery.

SUMMARY OF THE INVENTION

The invention in one form is directed to a vehicle with a power unit mechanically couplable with one or more primary loads, including a propulsion load. At least one electrical storage device has an electrical output which is couplable with at least one external load over a drive period of time. Each external load is distinct from the one or more primary loads. A generator is mechanically couplable with the power unit and electrically couplable with the at least one electrical storage device. The generator has an electrical charging output to the at least one electrical storage device. At least one electrical processing circuit is configured for selectively coupling the at least one electrical storage device with one or more external loads. The at least one electrical processing circuit is also configured for selectively coupling the generator with the at least one electrical storage device over a charging period of time. The charging output and the charging period of time are dependent upon the electrical output from the at least one electrical storage device and the drive period of time.

The invention in another form is directed to a method of operating a vehicle, including the steps of: mechanically driving at least one primary load with a power unit, the at least one primary load including a propulsion load; mechanically driving an electrical generator using the power unit; electrically powering at least one external load using at least one electrical storage device, each external load being distinct from the one or more primary loads; and controlling the generator to charge the at least one electrical storage device, dependent upon an average duty cycle of the at least one external load.

The invention in another form is directed to a method of operating a vehicle, including the steps of: mechanically driving at least one primary load with a power unit, the at least one primary load including a propulsion load; mechanically driving an electrical generator using the power unit, the generator having an electrical charging output; electrically powering at least one external load using an electrical output from at least one electrical storage device over a drive period of time, each external load being distinct from the one or more primary loads; and controlling the generator to charge the at least one electrical storage device over a charging period of time, the charging output and the charging period of time being dependent upon the electrical output from the at least one electrical storage device and the drive period of time.

DETAILED DESCRIPTION OF THE INVENTION

Vehicles may use hybrid electric-IC engine technology with a storage battery to supplement the internal combustion engine with electric power boost. This is expected to work very well, but the electric power boost is only available for relatively short periods of time. The amount of time available for electric boost is determined by the size of the battery. Batteries with enough capacity to provide sustained levels of power boost will of necessity be large, heavy and costly, thus limiting their practicality.

Another advantage with battery boosted hybrids is the ability to operate electrical drives with the IC engine shut down. For example, the HVAC, lights, air compressors, cooling fans, grain tank unloading systems, etc., could be operated without the need to start the IC engine. The length of time these drives can be operated with the engine off is limited, again, by the size of the battery. Batteries large enough to do significant work for extended time periods with the engine off may be too large, heavy and costly to be practical.

The present invention as described herein provides a vehicle, such as a work machine, and corresponding method of operation with sustained, increased power capability for external loads (such as a clean grain unloading system), with many of the advantages of electric-IC engine hybrids, while still meeting increasingly stringent emissions requirements.

Figure 1:
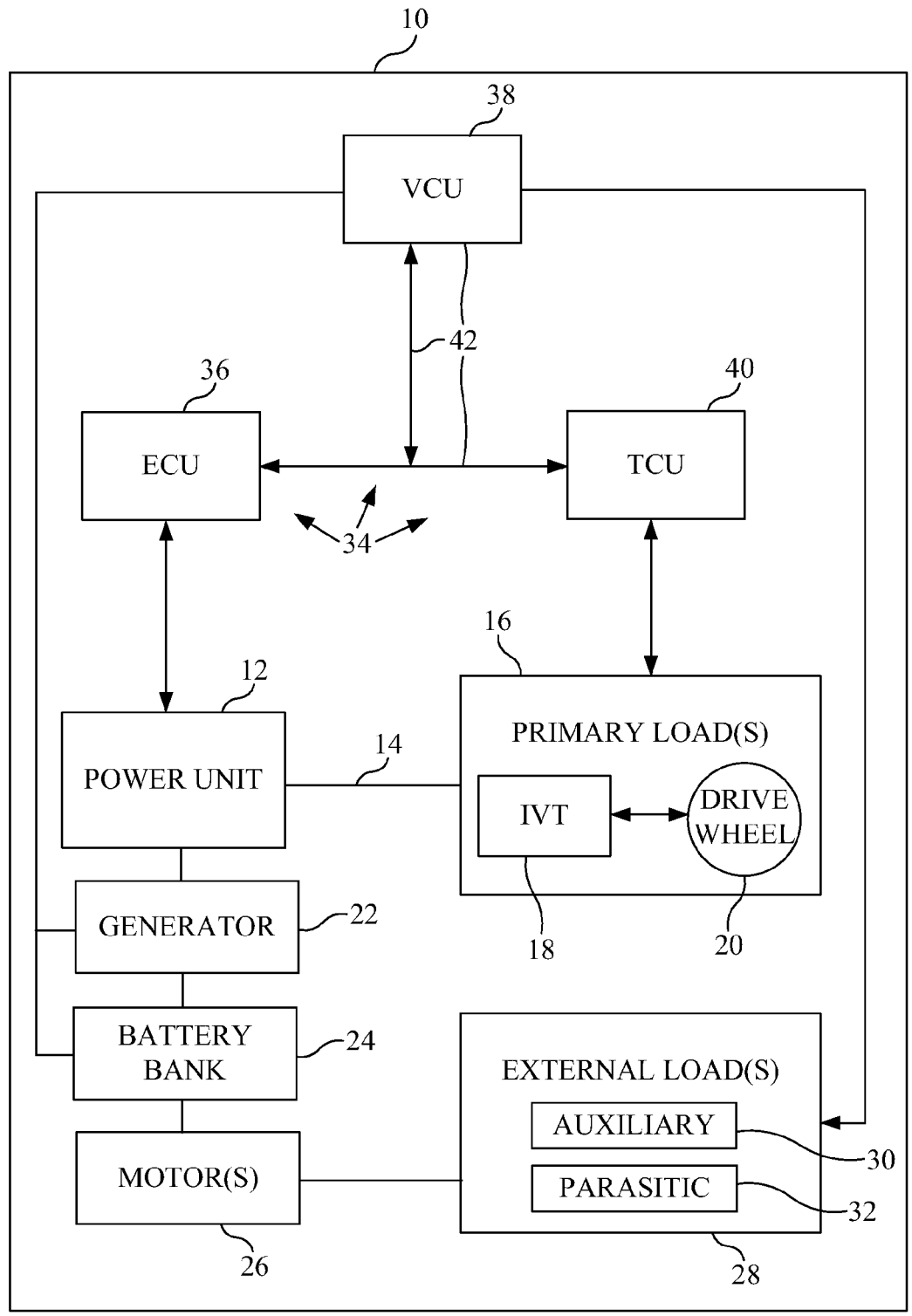
FIG. 1 is a schematic illustration of an embodiment of a vehicle of the present invention.

Referring now to FIG. 1, there is shown a schematic illustration of an embodiment of a vehicle 10 of the present invention. For purposes of illustration and discussion, vehicle 10 is assumed to be a work machine such as an agricultural, construction, forestry, mining, or industrial work machine. However, it is to be understood that vehicle 10 could be a different type of vehicle, such as a passenger car, truck, semi-tractor, etc.

Vehicle 10 includes a power unit in the form of an IC engine 12 which typically includes an output crankshaft 14 which is part of a drivetrain, with a rated output which drives one or more primary loads 16. The primary load(s) include a propulsion load for selectively propelling vehicle 10 across the ground. To that end, an IVT 18 in the form of a hydrostatic transmission may be selectively engaged/disengaged with crankshaft 14, and provides motive force to one or more drive wheels 20. Of course, it will be appreciated that in the case of a track-type work vehicle, crankshaft 14 may be coupled with a ground engaging track.

In the embodiment shown, the power unit is assumed to be a large diesel engine used in a work machine, but could be differently configured for other applications. For example, the power unit could also be a gasoline engine, propane engine, etc. As a further example, if vehicle 10 is configured as a passenger car, it may be possible to configure power unit 10 as an electric motor providing tractive force to one or more ground engaging wheels.

IC engine 12 also mechanically drives a generator 22 providing an electrical output. Generator 22 is electrically coupled with at least one electrical storage device, which may be in the form of one or more batteries and/or one or more capacitors. For purposes of discussion, the at least one electrical storage device will be assumed to be a number of batteries which are typically connected together as a bank of batteries 24 with a preselected output voltage and amp*hour rating. The power from battery bank 24 can be applied as DC power, or inverted and applied as AC power.

One or more motors 26 are selectively coupled with and driven by battery bank 24. Motors 26 in turn may be used to drive one or more external loads 28, which includes one or more auxiliary loads 30, and may include one or more parasitic loads 32. Auxiliary loads 30 are non-drivetrain hydraulic or electric loads placed upon IC engine 12 through selective operator intervention (e.g., an auxiliary hydraulic load such as an unloading auger on a combine, a front end loader, a backhoe attachment, etc.) Parasitic loads 32 are non-drivetrain loads placed upon IC engine 12 through normal operation of the work machine, without operator intervention (e.g., an electrically driven engine cooling fan associated with IC engine 12, etc.).

The operation of vehicle 10 is under the control of at least one electrical processing circuit 34. When vehicle 10 is configured as a work machine, as shown in FIG. 1, the electrical processing circuit is typically in the form of multiple controllers which communicate with each other and control different parts of the work machine. More particularly, an engine control unit (ECU) 36 electronically controls operation of IC engine 12, and is coupled with a plurality of sensors (not specifically shown) associated with operation of IC engine 12. For example, ECU 36 may be coupled with a sensor indicating engine control parameters such as an air flow rate within one or more intake manifolds, engine speed, fueling rate and/or timing, exhaust gas recirculation (EGR) rate, turbocharger blade position, etc. Additionally, ECU 36 may receive output signals from vehicle control unit (VCU) 38 representing vehicle control parameters input by an operator, such as a commanded ground speed (indicated by a position of the gear shift lever and throttle and/or hydrostat lever) or a commanded direction of vehicle 10 (indicated by an angular orientation of the steering wheel).

Transmission control unit (TCU) 40 electronically controls operation of IVT 18, and is typically coupled with a plurality of sensors (not shown) associated with operation of IVT 18. ECU 36, VCU 38 and TCU 40 are coupled together via a bus structure providing two-way data flow, such as controller area network (CAN) bus 42.

Although the various electronic components such as ECU 36, VCU 38 and TCU 40 are shown coupled together using wired connections, it should also be understood that wireless connections may be used for certain applications. Further, ECU 36, VCU 38 and TCU 40 can be configured with any desired combination of hardware, software and/or firmware, and could also be combined into a single controller.

Figure 2A:
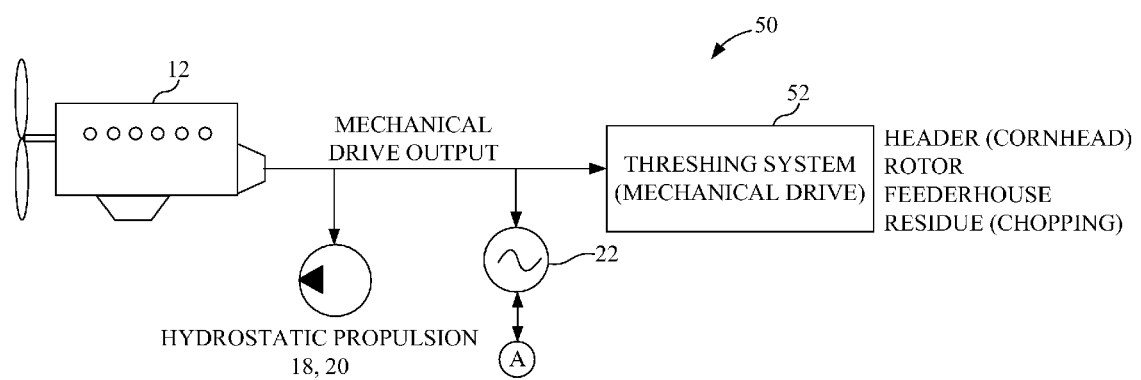
FIGS. 2A and 2B are a schematic illustration of a particular embodiment of a vehicle of the present invention in the form of an agricultural combine.
Figure 2B:
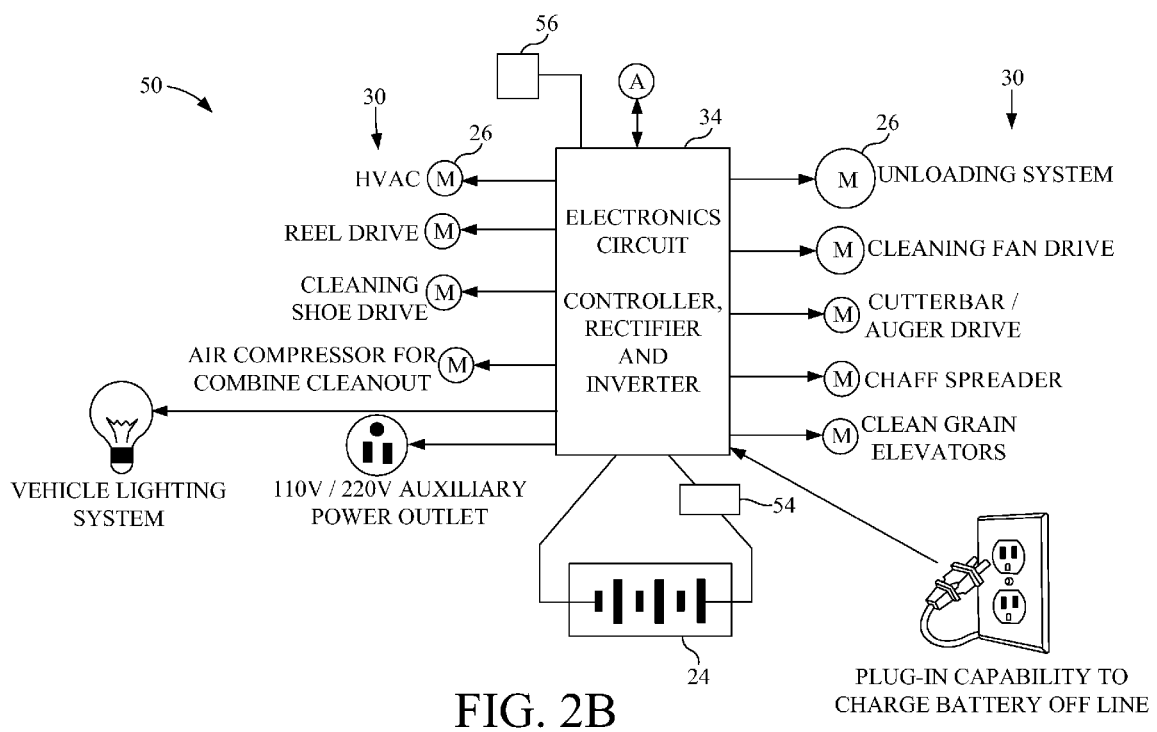

Referring now to FIGS. 2A and 2B, a specific embodiment of a vehicle 50 of the present invention will be described in greater detail. In the embodiment of FIGS. 2A and 2B, vehicle 50 is assumed to be an agricultural work machine in the form of a John Deere agricultural combine, but could be a different type of work machine such as a construction, forestry, mining, or industrial work machine.

The primary loads driven by primary IC engine 12 include two types of drivetrain driven loads; namely, loads associated with the hydrostatic propulsion 18, 20 and loads associated with the threshing system 52. The threshing system loads are drivetrain loads associated with one or more of the following: a cutting platform; a header; a feederhousing; a rotor; a separator; and a residue chopper.

IC engine 12 also mechanically drives generator 22. Generator 22 can be connected to the PTO gearbox, integrated into the engine flywheel, or even belt driven from the crankshaft 14. Generator 22 is controlled by electronics circuit 34 to charge the battery bank 24, and can also be controlled to directly power the one or more motors 26 when IC engine 12 is running.

The external loads 28 driven by battery bank 24 and motors 26 include two types of non-drivetrain, hydraulic or electrical loads; namely, auxiliary loads commanded by an operator and parasitic loads not commanded by an operator. In the embodiment of FIG. 2, the auxiliary loads 30 are non-drivetrain loads associated with one or more of the following: a heating and air conditioning system; a reel drive; a cleaning shoe drive; an air compressor for cleanout function; a vehicle lighting system; a clean grain unloading system; a cleaning fan drive; a cutterbar/auger drive; a chaff spreader; a clean grain elevator; and an auxiliary electrical power outlet. All of these auxiliary loads 30 (except the lighting system and auxiliary electrical power outlet) are indicated as being electrically driven loads, powered by respective electric motors 26 (each designated "M"). Each of the various motors 26 is selectively energized over a drive period of time using electronics circuit 34 (shown schematically in block form), which may include a VCU, a rectifier and a DC-to-AC inverter.

Electronics circuit 34 is configured for selectively coupling the battery bank 24 with a motor M associated with a selected external load 28, and for selectively coupling generator 22 with the battery bank 24 over a charging period of time. A detector 54 is coupled with electronics circuit 34, and monitors power consumption over time from the battery bank 24. Electronics circuit 34 selectively controls the charging output and the charging period of time from generator 22, dependent upon the power consumption over time by the one or more motors 26. In one embodiment, electronics circuit 34 can selectively couple generator 22 with the battery bank 24 such that a total charging amp*hours from generator 22 approximates a total drive amp*hours from battery bank 24.

In the case where multiple external loads are selectively driven by an operator, it is probably necessary to monitor the power consumption by the battery bank 24 and/or individual motors 26 such that the total power consumption and duty cycles can be determined, allowing control of the generator 22 with a charge rate which is sufficient to maintain a charge in the battery bank 24 for intermittently driving the external loads 28. It may be easiest to monitor the power consumption at the output of the battery bank 24, rather than at the individual external loads 28. However, it will be appreciated that the power consumption could also be monitored separately at the discrete external loads 28.

Moreover, if the number and duty cycle of external loads allows a baseline assumption as to power requirements for the external loads, then it is possible to eliminate the power monitoring of the external loads and simply assume power requirements for charging the battery bank 24. For example, if only an unloading system is available as an external load selectable by an operator, then the power requirements of the motor and the duty cycle can be assumed to establish the charging rate from the generator 22 to battery bank 24.

An unloading system as described above may be operated under control of electronics circuit 34 such that an unloading auger has a variable operating speed which is dependent upon time or an operating parameter associated with an unloading operation. For example, the unloading auger can have a variable operating speed which is dependent on an operating parameter such as: a sensed level of grain in a clean grain tank; a material level of a container to which the grain is transferred; a start up condition of the unloading auger; and/or a type of grain being augered through the unloading auger. To that end, a generic sensor 56 is shown coupled with electronics circuit 34 in FIG. 2B for detecting one or more of such operating parameters. Alternatively, an operator may input such operating parameters to electronics circuit 34.

The external loads 28 can be hardwired to the electronics circuit 34, a respective motor 26 and/or battery bank 24, or alternatively may be coupled using modular connectors or plugs (e.g., one or more of the electrical plug-in outlets shown in FIG. 2B). Further, the external loads 28 may be driven at the same or a different operating speed than the IC engine 12. This allows the external load functions to be at a different speed than the threshing and propulsion functions, which can be important for certain operating conditions such as tougher crop material when approaching dusk, etc.

According to another aspect of the present invention, generator 22 can be configured as an integral motor/generator. This allows intelligent power management (IPM) by normally powering the primary load(s) with IC engine 12, and also provides the capability to transfer additional power to the drivetrain on the output side of IC engine 12. Electronic processor 34 can selectively operate the motor/generator in a motor mode, such that the motor 22 is selectively coupled and thereby driven with the battery bank 24. In this manner, motor 22 can selectively transfer additional mechanical power back to the drivetrain coupled with power unit 12.

In the embodiment shown and described above, the primary IC engine 12 directly drives only the propulsion loads and the threshing system loads. The battery bank 24 and motors 26 drive the external loads 28, including the auxiliary loads 30 and parasitic loads 32. However, depending upon how the IC engine 12 is sized and configured, it may be desirable to drive at least some of the auxiliary loads 30 and/or parasitic loads 32 using IC engine 12. In any event, enough of the external loads 28 are driven by battery bank 24 and motors 26 such that IC engine 12 is not placed in an overload condition during operation.

Figure 3:
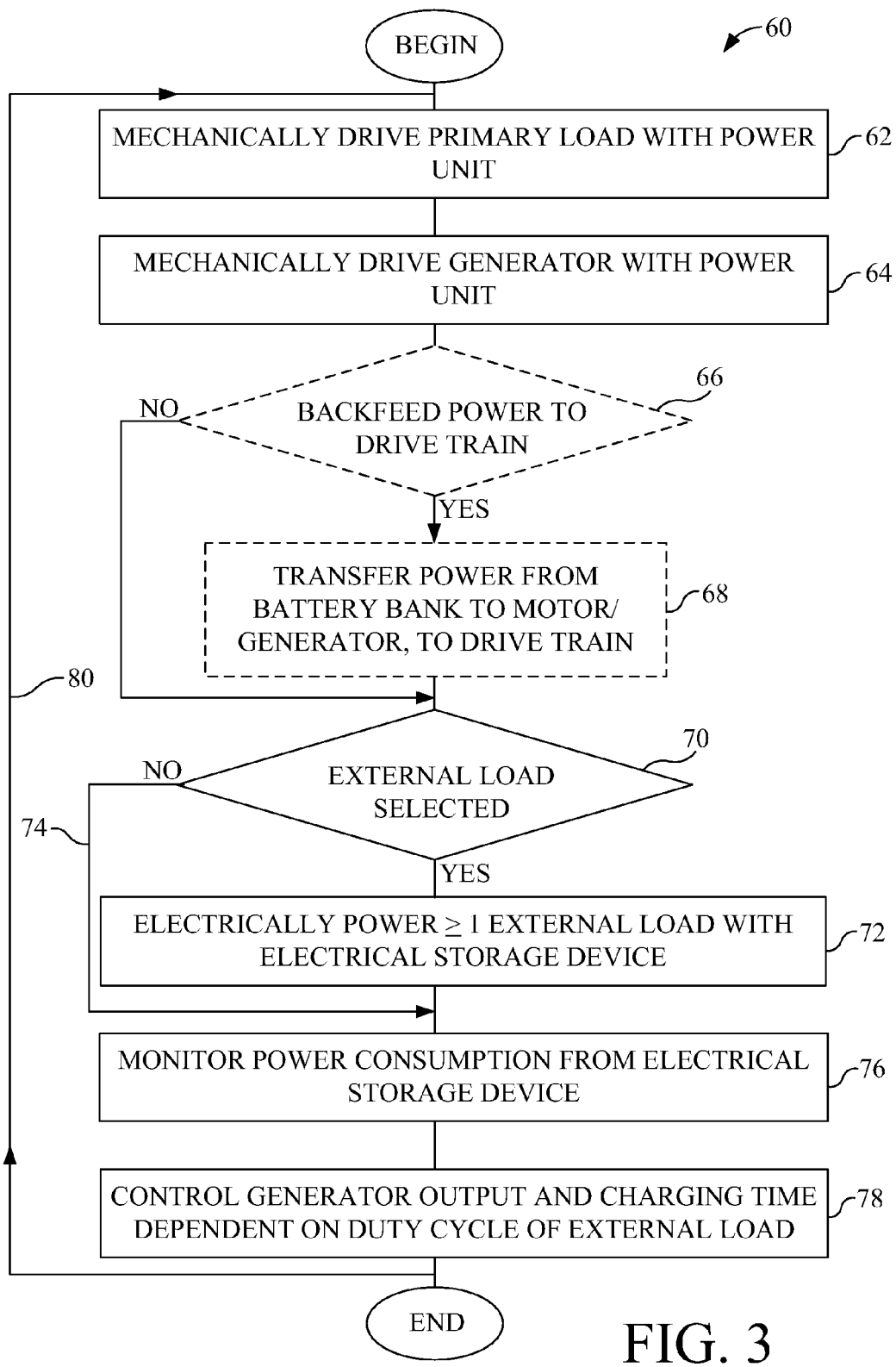
FIG. 3 is a flowchart of an embodiment of a method of operation of a vehicle of the present invention.

Referring now to FIG. 3, an example of a generalized method of operation 60 of a vehicle 10 according to the present invention will now be described. It will be appreciated that the particular location of the logic control blocks and decision blocks shown in FIG. 3 can vary, depending on the application.

At the start-up of the power unit 12 within the vehicle 10, the power unit 12 selectively drives one or more primary loads 16, including a propulsion load (block 62). In the case where the vehicle 10 is configured as a work machine, this is typically done by engaging an IVT or a clutch. The power unit 12 also selectively drives generator 22 through the mechanical interconnection with the drive train from power unit 12 (block 64).

Decision block 66 and block 68 (shown in dashed lines) correspond to an optional backfeeding of power from the battery bank 24 to the drive train from power unit 12, in the event that generator 22 is configured as a motor/generator, as described above. This IPM can be based upon known engine load sensing and inferencing techniques.

At decision block 70, a determination is made as to whether an operator has selectively actuated an external load, such as by depressing a switch, operating a lever, etc. If an external load has been selected, then electronics circuit 34 energizes one or more electric motors 26 by coupling the motor(s) 26 with battery bank 24. Alternatively, electronics circuit 34 can couple the motor(s) directly with generator 22 (block 72), as described above. The motor(s) 26 can be operated with a fixed speed, or alternatively operated with a variable speed, as described in more detail below.

If an external load has not been selected by an operator, then control simply passes via line 74 to bypass actuation of the electric motor(s).

At block 76, the power consumption to the one or more electric motor(s) 26 is monitored using suitable known sensors or detectors (not shown). The power consumption by the electric motors is a function of the electrical power (voltage*amperage) over a period of time. The period of time that the motor(s) 26 operate, relative to a time corresponding to an average frequency of operation of the motor(s) 26, can be used to determine a duty cycle of the motor(s) 26. The power consumption by the motor(s) 26 can be conveniently monitored at the output side of battery bank 24, or separately monitored at the individual motor(s) 26, as described above. Based upon the monitored power consumption to the electric motor(s) 26, electronics circuit 34 controls generator 22 to provide a desired charging output to battery bank 24 over a charging period of time (block 78). The control logic shown in FIG. 3 recurs (line 80) until the power unit 12 is turned OFF, designated at "END".

A specific example of a method of operation of a vehicle configured as the agricultural combine shown in FIGS. 2A and 2B will now be described in greater detail. This example of operation will be described with reference to an auxiliary load 30 in the form of an unloading auger which is part of the unloading system shown in FIG. 2B.

In the technological field of agricultural harvesters, one area of particular interest is the development of larger combines with 400 bushel and larger grain tanks. The current unloading system provides an unload rate of 3.3 bushels/sec (bu/sec) through an unloading auger. This will be inadequate for the new, larger machines. It is anticipated that the unload rate needed for these new machines will be 4 bu/sec or more. An unloading system coupled with the IC engine and using the current auger technology providing 4 bu/sec unload rate would require approximately 37 kW of power to convey the grain. When an unloading system of this size is switched ON, the rapid spike in engine load may be beyond what can be delivered with the engine output limitations for torque curve and transient load acceptance. The result could be an unacceptable drop in RPM of the IC engine and degradation in functional combine performance resulting from engaging the unloading system while harvesting to unload on the go.

The present invention in general eliminates the current mechanical (clutched) drive for the unloading system with an electric drive using a motor 26, generator 22 and battery bank 24 for power storage. The unloading system, with augers, could essentially remain unchanged. The auger system is driven by an electric motor 26 powered through an inverter from energy stored in the battery bank 24 rather than being driven directly from the drivetrain from IC engine 12. To engage the unloading system, the operator could actuate a switch in the operator's cab which signals the electronics circuit 34 to draw power from the battery bank 24 to the unloading system electric motor 26, which would start turning to engage the augers. The controller 34, however, can be programmed to start the electric motor 26 slowly for the first second or two of engagement and ramp up to normal auger speed over a predetermined period of time. This reduces or eliminates the massive spike in engagement load required to accelerate the augers and grain to start moving out of the clean grain tank. By engaging and accelerating gradually, the loads in the drives and augers can be minimized. Components can be designed lighter and their durability improved, if the engagement shock loads are minimized. As the grain tank starts to empty out, the instantaneous unload rate naturally drops off due to less uniformity of grain feeding from the sloped sides of the grain tank into the cross augers. This effect can be minimized by gradually increasing the speed of the electric drive motor 26 to cause the augers to spin faster during the last 20-30 seconds of grain tank unloading. In essence, the unload rate is adjusted automatically by the controller commanding the best electric motor speed at any given point in time. Initially, upon engagement, the motor may be commanded to accelerate slowly to avoid engagement shocks, then commanded to gradually accelerate as the grain feed rate tends to drop off as the tank empties.

It may be possible upon engagement of the electric motor 26 to actually rock the motor back and forth slightly to initiate movement of the grain. This could also help shake the grain loose for damp high moisture grain that tends not to want to flow easily. The current feedback from the inverter to the electric motor 26 can be used as an indicator for how much grain is being unloading to increase the auger speed as the tank empties. The maximum rate can also be automatically varied as a function of the grain being harvested to reduce grain loss to the cart.

Another use of the variable speed capability of the electric drive is to allow the operator to reduce the speed of the unloading system to prevent grain spillage and make it easier to top off grain carts. Having a high unload rate (e.g., 4 bu/sec) for quick unloading and a lower rate (e.g., 2 bu/sec) may be desirable for topping off and filling semi-trailers without grain spillage.

Generator 22 in essence charges the battery bank 24 continuously at a low rate. Since the unloading system is typically switched on approximately 30% of the time (i.e., a duty cycle of approximately 30%), charging capacity of generator 22 could be 30% (or slightly higher due to inefficiency) of the drive motor capacity. Assuming the unloading system requires 30 kW when running (duty cycle averaged), then the generator 22 could be sized to provide approximately 12-15 kW of charging capacity. This would be sufficient to fully charge the battery and keep it charged on an ongoing basis. When the battery bank reaches full charge, the generator can be shut off by the controller 34 and the mechanical input power demand from the engine eliminated at that point until the unloading system is again switched on and the battery depleted. In any event, the unloading system maximum power demand from the engine would not exceed 12-15 kW due to the sizing of the generator 22. This would reduce or eliminate the need for power boost from the engine.

Currently 25 kW of power boost is provided by increasing the fuel rate to the engine in order to offset the massive load spike from the unloading system. With the hybrid concept, the unloading system power would come from the battery which would handle the load spike, no matter how large. If we assume the duty cycle averaged load demand for the unloading system is 30 kW over a period of 2 minutes, then the battery would have to store approximately 1.0 kWh of electrical energy (30 kW*2 min*hour/60 min=1.0 kWh). The battery bank 24 could be sized just for this, or an optional, larger storage battery could also be used to provide additional power for auxiliary devices such as power the HVAC, air compressor, or 110 v/220 v power tools like grinders, drills, etc. These functions could be provided with the engine off. The grain tank could be unloaded even with the engine off.

The present invention enables a significant improvement in power and fuel economy for farm machinery like combines and tractors where the varying load associated with intermittent unloading exists. The shock of engagement can be smoothed out with a hybrid power train. Energy stored in batteries and/or capacitors can be drawn out and used at any time to provide the power to unload the grain tank without increasing the load on the diesel engine. It should be possible to avoid problems with transient response with Tier 4 (T4) engines. Fuel economy and torque curve can be improved if the variability of the load application can be reduced. With proper sizing of the storage battery or battery bank, the grain tank can be unloaded without starting the diesel engine. Auxiliary devices such as HVAC, power tools, air compressor, etc, could also be powered with the engine shut off. Sizing of the battery bank determines the run time for the auxiliary loads. Being able to keep the cab cool and run an air compressor to clean the machine with the engine off, would be a feature not possible with today's machine, which requires the diesel engine to run for these functions. Fuel economy would be enhanced if the diesel engine could be kept off and the battery used instead. Running a 500 hp diesel engine to cool the cab and run a small air compressor is not fuel efficient. Charging batteries at a time when the engine is running at full load would be very fuel efficient since the Brake Specific Fuel Consumption (BSFC) at that point is much better than at idle.

Having described the preferred embodiment, it will become apparent that various modifications can be made without departing from the scope of the invention as defined in the accompanying claims.

The invention claimed is:

1. A vehicle, comprising:
   a power unit mechanically couplable with at least one primary load, said at least one primary load including a propulsion load;
   at least one electrical storage device having an electrical output which is couplable with at least one external load over a drive period of time, each said external load being distinct from said at least one primary load;
   a generator which is mechanically couplable with said power unit and electrically couplable with said at least one electrical storage device, said generator having an electrical charging output to said at least one electrical storage device; and
   at least one electrical processing circuit configured for selectively coupling said at least one electrical storage device with at least one said external load, and for selectively coupling said generator with said at least one electrical storage device over a charging period of time, said charging output and said charging period of time being dependent upon said electrical output from said at least one electrical storage device and said drive period of time.

2. The vehicle of claim 1, wherein said at least one electrical processing circuit selectively controls said charging output and said charging period of time from said generator, dependent upon an average duty cycle of said at least one external load.

3. The vehicle of claim 1, including a detector for monitoring power consumption over time from said at least one electrical storage device, and wherein said at least one electrical processing circuit selectively controls said charging output and said charging period of time from said generator, dependent upon said power consumption over time.

4. The vehicle of claim 1, wherein said at least one electrical processing circuit selectively couples said generator with said at least one electrical storage device such that a total charging amp*hours from said generator approximates a total drive amp*hours from said at least one electrical storage device.

5. The vehicle of claim 3, wherein said at least one electrical processing circuit can vary at least one of said charging output and said charging period of time to vary said total charging amp*hours.

6. The vehicle of claim 1, wherein said at least one electrical processing circuit is configured for selectively coupling said at least one electrical storage device with at least one said external load while said power unit is in an OFF state.

7. The vehicle of claim 1, wherein said at least one electrical processing circuit can selectively operate said generator to directly power at least one said external load.

8. The vehicle of claim 1, wherein each said external load corresponds to one of an auxiliary load and a parasitic load.

9. The vehicle of claim 8, wherein said power unit is coupled with a drive train and each said primary load is driven by said drive train, each said auxiliary load being a non-drivetrain load with operator intervention, and each said parasitic load being a non-drivetrain load without operator intervention.

10. The vehicle of claim 9, wherein said at least one electrical processing circuit includes a vehicle control unit (VCU) and a transmission control unit (TCU), said VCU controlling operation of at least one said auxiliary load.

11. The vehicle of claim 9, wherein said vehicle is an agricultural combine, and said at least one auxiliary load corresponds to at least one of:
   a clean grain unloading system;
   a heating and air conditioning system;
   a reel drive;
   a cleaning shoe drive;
   an air compressor for cleanout function;
   a vehicle lighting system;
   a cleaning fan drive;
   a cutterbar/auger drive;
   a chaff spreader;
   a clean grain elevator; and
   an auxiliary electrical power outlet.

12. The vehicle of claim 8, wherein said vehicle is an agricultural combine, and said at least one auxiliary load includes a clean grain unloading auger driven by an electric motor.

13. The vehicle of claim 12, wherein said at least one electrical processing circuit controls operation of said unloading auger with a variable operating speed.

14. The vehicle of claim 13, wherein said variable operating speed of said unloading auger is dependent upon one of time and an operating parameter associated with an unloading operation.

15. The vehicle of claim 14, wherein said operating parameter includes at least one of:
   a sensed level of grain in a clean grain tank;
   a material level of a container to which the grain is transferred;
   a start up condition of said unloading auger;
   a type of grain being augered through said unloading auger.

16. The vehicle of claim 15, wherein said at least one electrical processing circuit is configured to speed up said variable operating speed of said unloading auger as the sensed material level within the container approaches a full level.

17. The vehicle of claim 16, wherein said material level of said container is determined by one of a sensor and an operator input.

18. The vehicle of claim 17, wherein said at least one electrical processing circuit is configured to at least one of slow down and stop said variable operating speed of said unloading auger as the material level within the container approaches a full level.

19. The vehicle of claim 18, wherein said at least one electrical processing circuit ramps up said variable operating speed of said unloading auger at said start up condition.

20. The vehicle of claim 13, wherein said at least one electrical processing circuit alters a forward speed and a reverse speed of said motor at a start up condition to loosen any stationary material attached to said unloading auger.

21. The vehicle of claim 13, including a DC-to-AC inverter coupled between said at least one electrical storage device and said electric motor, and wherein said at least one electrical processing circuit varies said operating speed dependent upon a feedback current from said inverter.

22. The vehicle of claim 1, wherein said vehicle is an agricultural harvester, and said at least one primary load includes a threshing system load.

23. The vehicle of claim 22, wherein said agricultural harvester is an agricultural combine, and said threshing system load corresponds to at least one of:
   a cutting platform;
   a header;
   a feederhousing;
   a rotor;
   a separator; and
   a residue chopper.

24. The vehicle of claim 1, wherein said power unit is an internal combustion (IC) engine.

25. The vehicle of claim 1, wherein said generator is configured as an integral motor/generator, and said at least one electrical processing circuit is configured for selectively operating said motor/generator as a motor, and selectively coupling and thereby driving said motor with said at least one electrical storage device.

26. The vehicle of claim 25, wherein said motor can selectively transfer mechanical power back to a drivetrain coupled with said power unit.

27. The vehicle of claim 1, wherein said at least one electrical storage device comprises at least one of: at least one battery and at least one capacitor.

28. The vehicle of claim 1, wherein said vehicle is a work machine in the form of a construction work machine, an agricultural work machine, a forestry work machine, a mining work machine, and an industrial work machine.

29. A method of operating a vehicle, comprising the steps of:

mechanically driving at least one primary load with a power unit, said at least one primary load including a propulsion load;

mechanically driving an electrical generator using said power unit;

electrically powering at least one external load using at least one electrical storage device, each said external load being distinct from said at least one primary load; and controlling said generator to charge said at least one electrical storage device, said controlling step including selectively controlling a charging output and a charging period of time from said generator, dependent upon an average duty cycle of said at least one external load.

30. The method of operating a vehicle of claim 29, including the step of monitoring power consumption over time from said at least one electrical storage device, and wherein said controlling step includes selectively controlling a charging output and a charging period of time from said generator, dependent upon said power consumption over time.

31. The method of operating a vehicle of claim 30, wherein said controlling step includes varying at least one of said charging output and said charging period of time to vary said total charging amp*hours.

32. The method of operating a vehicle of claim 29, wherein said electrically powering step is carried out while said power unit is in an OFF state.

33. The method of operating a vehicle of claim 29, wherein said generator may be selectively operated to directly power at least one said external load.

34. The method of operating a vehicle of claim 29, wherein said vehicle is an agricultural combine, and said at least one auxiliary load includes a clean grain unloading auger driven by an electric motor, and wherein said electrically powering step includes operating said unloading auger with a variable operating speed.

35. The method of operating a vehicle of claim 34, wherein said variable operating speed of said unloading auger is dependent upon one of time and an operating parameter associated with an unloading operation.

36. The method of operating a vehicle of claim 29, wherein said generator is configured as an integral motor/generator, and including the steps of: selectively operating said motor/generator as a motor, and selectively coupling and thereby driving said motor with said at least one electrical storage device.

37. The method of operating a vehicle of claim 36, including the step of selectively transferring mechanical power back to a drivetrain coupled with said power unit.

38. A method of operating a work machine, comprising the steps of:

mechanically driving at least one primary load with a power unit, said at least one primary load including a propulsion load;

mechanically driving an electrical generator using said power unit, said generator having an electrical charging output;

electrically powering at least one external load using an electrical output from at least one electrical storage device over a drive period of time, each said external load being distinct from said at least one primary load; and controlling said generator to charge said at least one electrical storage device over a charging period of time, said charging output and said charging period of time being dependent upon said electrical output from said at least one electrical storage device and said drive period of time.

39. The method of operating a vehicle of claim 38, wherein said controlling step includes selectively controlling a charging output and a charging period of time from said generator, dependent upon an average duty cycle of said at least one external load.

40. The method of operating a vehicle of claim 38, including the step of monitoring power consumption over time from said at least one electrical storage device, and wherein said controlling step includes selectively controlling a charging output and a charging period of time from said generator, dependent upon said power consumption over time.

41. The method of operating a vehicle of claim 40, wherein said controlling step includes varying at least one of said charging output and said charging period of time to vary said total charging amp*hours.

42. The method of operating a vehicle of claim 38, wherein said electrically powering step is carried out while said power unit is in an OFF state.

43. The method of operating a vehicle of claim 38, wherein said generator may be selectively operated to directly power at least one said external load.

44. The method of operating a vehicle of claim 38, wherein said vehicle is an agricultural combine, and said at least one auxiliary load includes a clean grain unloading auger driven by an electric motor, and wherein said electrically powering step includes operating said unloading auger with a variable operating speed.

45. The method of operating a vehicle of claim 44, wherein said variable operating speed of said unloading auger is dependent upon one of time and an operating parameter associated with an unloading operation.

46. The method of operating a vehicle of claim 38, wherein said generator is configured as an integral motor/generator, and including the steps of: selectively operating said motor/generator as a motor, and selectively coupling and thereby driving said motor with said at least one electrical storage device.

47. The method of operating a vehicle of claim 46, including the step of selectively transferring mechanical power back to a drivetrain coupled with said power unit.

* * * * *